United States Patent [19]
Knepler et al.

[11] Patent Number: 5,522,556
[45] Date of Patent: Jun. 4, 1996

[54] WEIGHT CONTROLLED GRINDER AND WEIGHT SENSOR

[75] Inventors: John T. Knepler, Chatham; William E. Midden; David F. Ford, both of Springfield, all of Ill.

[73] Assignee: Bunn-O-Matic Corporation, Springfield, Ill.

[21] Appl. No.: 315,973

[22] Filed: Sep. 30, 1994

Related U.S. Application Data

[62] Division of Ser. No. 198,225, Feb. 17, 1994, Pat. No. 5,386,944.

[51] Int. Cl.⁶ .............................. B02C 25/00; G01L 1/04
[52] U.S. Cl. ............................ 241/34; 241/36; 241/135; 73/862.632; 73/862.634
[58] Field of Search ...................... 73/862.632, 862.633, 73/862.637, 862.638; 177/211, 229, 238; 99/280, 286, 289 R; 241/25, 34, 36, 134, 135

[56] References Cited

U.S. PATENT DOCUMENTS

| | | | |
|---|---|---|---|
| 1,079,465 | 11/1913 | Bausman | 241/135 |
| 1,608,718 | 11/1926 | Boyle et al. | 241/34 |
| 2,059,514 | 11/1936 | Frediani | 241/36 |
| 2,868,109 | 1/1959 | Davis | 241/36 X |
| 2,900,140 | 8/1959 | Schuhmann et al. | 241/36 |
| 4,007,675 | 2/1977 | Cailliot et al. | 241/36 X |
| 4,441,569 | 4/1984 | Sashiki et al. | 177/211 |
| 4,749,134 | 6/1988 | Van Camp | 241/100 |
| 4,789,106 | 12/1988 | Weber . | |
| 4,893,758 | 1/1990 | Foley et al. | 241/100 |
| 4,936,515 | 6/1990 | Poag et al. | 241/36 |
| 4,971,259 | 11/1990 | Nidiffer . | |
| 5,134,887 | 9/1992 | Bell | 73/718 |
| 5,186,399 | 2/1993 | Knepler et al. . | |

OTHER PUBLICATIONS

Bunn–Omatic G9–2, product sheet, copyright 1990.
Model G9–2 Coffee Grinder Operating & Service Manual, copyright 1987.
Bunn–O–Matic, Turbo Model, copyright 1990.
Bunn–O–Matic G9–2, operating and service manual, copyright 1987.

Primary Examiner—Timothy V. Eley
Attorney, Agent, or Firm—Trexler, Bushnell, Giangiorgi & Blackstone, Ltd.

[57] ABSTRACT

A coffee grinding apparatus which includes a coffee bean grinding mechanism and a weighing device associated with the grinding mechanism to weigh ground coffee. A receptacle is associated with the weighing device and positioned below the grinding mechanism for receiving ground coffee from the grinding mechanism. The weighing device generates an actual weight signal corresponding to the weight of the ground coffee dispensed into the receptacle. A selecting device is provided to allow a user to select a weight of ground coffee to be produced by the apparatus. A dispensing assembly may be associated with a whole bean hopper, the selecting device and weighing device are coupled to a control circuit which controls the grinding apparatus. The control circuit operates the dispensing assembly and/or the grinding mechanism as a function of a comparison of the actual weight signal and the selected weight signal. As the relationship between the selected weight signal and actual weight signal approaches parity, the control circuit controls to dispensing assembly and/or grinding mechanism to controllably approach the selected weight of ground coffee.

9 Claims, 7 Drawing Sheets

WEIGHT CONTROLLED GRINDER AND WEIGHT SENSOR

This is a divisional of application Ser. No. 08/198,225 filed on Feb. 17, 1994, now U.S. Pat. No. 5,386,944.

BACKGROUND

The present invention relates to a coffee grinding apparatus which produces a selected weight of ground coffee.

A variety of coffee grinding apparatus are available which weigh a quantity of whole coffee beans to be ground or which measure a desired quantity of whole coffee beans as a function of time. For example, U.S. Pat. No. 4,789,106 to Weber, issued Dec. 6, 1988, provides a grinding apparatus having a pair of hoppers in a gravity feed relationship with a grinding mechanism. Whole coffee beans are dispensed from the hoppers onto a bean bucket which mechanically weighs the whole beans prior to grinding. When a quantity of whole beans has accumulated on the bean bucket, the bean bucket tips and drops the whole beans into the grinding mechanism.

A problem with the device as shown in Weber, and other devices of this type, is that the beans are weighed in the whole coffee bean form prior to grinding and therefore cannot compensate for the size, density, oiliness and other characteristics of the beans. It is important to consider these characteristics in measuring ground coffee since these characteristics affect the weight of the ground coffee.

In producing brewed beverages it is important to maintain the consistency of the flavor of beverages produced by the brewing machine. Customers appreciate a predictably good tasting cup of coffee. A key factor in maintaining consistency in brewing beverages is maintaining the proper amount of ground coffee used in the infusion process. Maintaining the proper amount of coffee is also important to coffee vendors to economically manage and efficiently utilize ground coffee. The flavor of a brewed beverage such as coffee may require maintaining a tolerance for the measurement of the ground coffee within ±0.1 ounce. Such precise measurement tolerances require highly accurate measuring controls.

With regard to the device in Weber, the device measures whole beans and therefore may not be able to maintain the ±0.1 ounce weighing tolerance. The device in Weber allows beans to flow from a hopper until a predetermined weight is sensed by the bean bucket. When the predetermined weight of whole beans is sensed, a hopper gate between the hopper and bean bucket is closed. In view of the beans being in a whole bean state, the measurement may be inaccurate since numerous whole beans may be dispensed from the hopper after the desired weight is sensed. The problem of measuring beans using a device as shown in Weber is exacerbated when the whole beans have an oily characteristic such as is found in dark roast beans, especially, french or espresso roast beans. The oiler beans tend to cling to each other thereby almost assuring an inaccurate measurement.

Another problem with accurately weighing ground coffee is that many coffee grinding apparatus which combine a storage hopper and a dispensing mechanism rely on volume based measurement to dispense a weight of coffee beans. For instance, in a device combining a storage hopper with an auger to dispense beans from the hopper, the grinding device will dispense a predetermined volume of coffee to be ground, in contrast to traditional coffee measuring methods in which coffee is measured by weight. When beans are of a consistent density, a timed or volume measuring mechanism will generally yield a fairly accurate weight measurement. In reality, coffee beans often vary in density due to variations in the type of bean, the roast of the bean, and/or blending. These variations may occur even within a single brand or type of coffee. Such measuring and grinding apparatus may not achieve the desired tolerance where precision weight control is required.

In view of the foregoing problems and requirements, there is a need for a grinding apparatus which precisely dispenses a desired weight of ground coffee regardless of the characteristics of the whole coffee beans being ground.

OBJECTS AND SUMMARY

A general object of the present invention is to provide a coffee grinding apparatus which precisely grinds and dispenses a selected weight of ground coffee.

Another object of the present invention is to provide a coffee bean grinding apparatus which supports a receptacle in close proximity to a grinding mechanism which dispenses ground coffee.

Yet another object of the present invention is to provide a coffee bean grinding apparatus which provides a receptacle support structure which accommodates a wide variety of receptacle dimensions.

A further object of the present invention is to provide a coffee bean grinding apparatus which employs multiple hoppers and multiple grinding mechanisms, each mechanism being associated with a corresponding hopper, and provides precise control of the grinding mechanisms.

Still a further object of the present invention is to provide a method of grinding coffee beans to produce a selected weight of ground coffee.

An additional object of the present invention is to provide a novel weight sensor for weighing ground coffee.

Briefly, and in accordance with the foregoing, the present invention envisions a coffee grinding apparatus which includes a coffee bean grinding mechanism and a weighing device associated with the grinding mechanism to weigh ground coffee. A receptacle is associated with the weighing device and positioned below the grinding mechanism for receiving ground coffee from the grinding mechanism. The weighing device generates an actual weight signal corresponding to the weight of the ground coffee dispensed into the receptacle. A selecting device is provided to allow a user to select a weight of ground coffee to be produced by the apparatus. A dispensing assembly may be associated with a whole bean hopper, the selecting device and weighing device are coupled to a control circuit which controls the grinding apparatus. The control circuit operates the dispensing assembly and/or the grinding mechanism as a function of a comparison of the actual weight signal and the selected weight signal. As the relationship between the selected weight signal and actual weight signal approaches parity, the control circuit controls to dispensing assembly and/or grinding mechanism to controllably approach the selected weight of ground coffee.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

While the invention may be susceptible to embodiment in different forms, there is shown in the drawings, and herein will be described in detail, an invention with the understanding that the present description is to be considered an exemplification of the principles of the invention and is not intended to limit the invention to that as illustrated and described herein.

Figure 1:
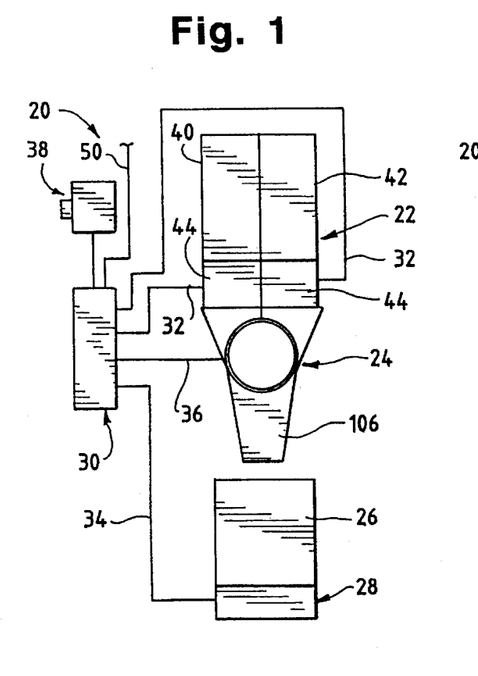
FIG. 1 is a diagrammatic representation of a coffee bean grinding apparatus of the present invention.

FIG. 1 shows a coffee grinding apparatus 20 of the present invention. The coffee grinding apparatus 20 includes means for dispensing beans or dispenser 22 operatively associated with a grinding mechanism 24 which grinds whole coffee beans and dispenses the ground coffee into a receptacle 26. The receptacle 26 is cooperatively associated with means 28 for weighing the ground coffee dispensed from the grinding mechanism 24 into the receptacle 26. A control circuit 30 is provided and is coupled or interfaced with several components including: the dispenser 22 by way of line 32; the weighing means 28 over line 34; and the grinding mechanism 24 over line 36.

The coffee grinding apparatus 20 produces a precise weight of ground coffee corresponding to a weight of coffee selected by a user. The control circuit 30 includes means 38 for selecting a desired weight of ground coffee to be produced by the apparatus 20, also referred to as selector 38. The selector 38 in combination with the control circuit 30 produces a selected weight signal which is compared to an actual signal generated by the weighing means 28 in order to determine whether the ground coffee produced by the grinding apparatus 20 is approaching or approximately equal to the desired selected weight of ground coffee. The control circuit 30 operates the dispenser 22 and/or the grinding mechanism 24, as a function of the selected weight compared to the actual weight of ground coffee.

More specifically, a user selects a desired weight of ground coffee using the selector 38, the dispensing means 22 dispenses whole coffee beans into the grinding mechanism 24 which then grinds the whole beans and discharges ground coffee into the receptacle 26. During the grinding operation, the weighing means 28 repeatedly weighs the ground coffee which accumulates in the receptacle 26 and transmits the actual weight signal to the control circuit 30 over line 34. The actual weight signal is compared to the selected weight of ground coffee to be produced. As the weight of the ground coffee sensed at the weighing means 28 approaches the desired selected weight of ground coffee, the control circuit 30 controls the dispenser 22 and/or the grinding mechanism 24 to controllably approach the selected weight. The control circuit 30 Controls the dispenser 22 by decreasing the rate at which beans are dispensed into the grinding mechanism 24 so that the selected weight of ground coffee is produced within a predetermined tolerance range. The control circuit controls the grinding mechanism 24 by slowing or stopping the grind operation.

As shown in FIG. 1, the dispenser 22 includes a pair of hoppers 40,42 and a dispensing assembly 44 associated with each hopper 40,42. The dispensing assembly 44 shown diagrammatically will be discussed in greater detail hereinbelow with reference to FIGS. 5 and 6. The grinding mechanism 24 is of known construction such as a burr grinder which can be set to produce a desired ground coffee particle size. The receptacle 26 can take the form of a container which is used to capture the ground coffee dispensed from the grinding mechanism 24 or, as is more desirable, is a brewing funnel. As will be described herein in greater detail with reference to FIGS. 8–10, a support structure 46 is provided to accommodate a variety of funnel sizes. As shown in FIG. 1, the means 28 for weighing is positioned below the receptacle 26. The diagrammatic illustrations of FIGS. 1 and 2 should not be construed to limit the position of the weighing means 28 to a location below the receptacle 26. To the contrary, FIGS. 8 and 9 position a weight sensor 48 of the weighing means 28 in a location other than below the receptacle 26 to take advantage of a mechanical relationship associated with the funnel support structure 46 shown therein.

The control circuit 30 includes circuitry which compares a signal from the weighing means 28 to a signal from the selecting means 38 in an iterative process to control the dispensing assembly 44 and/or the grinding mechanism 24 in relation to the weight of the ground coffee accumulating in the receptacle 26. During use, when the receptacle 26 is initially associated with the weighing means 28, the control circuit 30 "tares" the weight of the receptacle 26 so as to establish a zero point for weighing the ground coffee dispensed into the receptacle 26. In other words, only the weight of the ground coffee will be weighed and not the additional weight of the receptacle 26.

The control circuit 30 also includes means for storing preset selections. The preset selections are in the form of a selected weight of ground coffee which corresponds to the tare weight of a receptacle 26. The tare weight is the weight of the receptacle which is initially sensed by the weighing means 28 during the tare operation. In this regard, the control circuit 30 provides automatic recognition of a receptacle or funnel 26 engaged with the funnel support structure 46. This feature is useful when a user has multiple brewing apparatus or brewers of different sizes, each brewer employing a different size funnel. The control circuit 30 is programmed to store selected weights corresponding to each of the different funnels. As such, when a funnel is engaged with the funnel support structure 46, the weighing means 28 senses the weight of the funnel and generates a signal over line 34 to the control circuit 30. The control circuit 30 then automatically selects the weight of ground coffee for comparison to the actual weight of the accumulating ground coffee. This feature allows a user to place a funnel in the funnel support structure and automatically receive a precisely weighed charge of ground coffee for use with brewer associated with the funnel.

As an additional feature, the function of the selecting means 38 is distributable to a companion brewer (brewer not shown) by coupling the control circuit 30 to the brewer over control line 50. As such, a desired volume of beverage can be selected at the brewer thereby generating a signal transmitted over line 50 to the control circuit 30. The storage means retains a selected weight associated with the selected volume and employs this selected weight for comparison to the actual weight of the accumulating ground coffee to control the apparatus 20.

Figure 2:
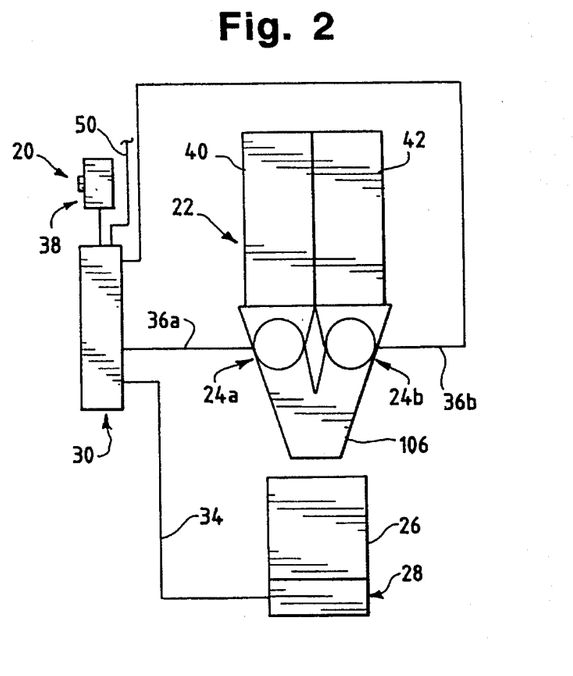
FIG. 2 is a diagrammatic representation of a coffee bean grinding apparatus of the present invention employing two hoppers and multiple grinding mechanisms, each grinding mechanism being associated with a corresponding hopper.

In a similar manner to the operation of the apparatus 20 as discussed with reference to FIG. 1, the apparatus 20 as shown in FIG. 2 operates by selecting a desired weight at the selection means 38 and iteratively comparing the weight of ground coffee dispensed into the receptacle 26 to the selected weight. The corresponding grinding mechanism 24a, 24b is controlled as a function of the iterative comparison.

Figure 3:
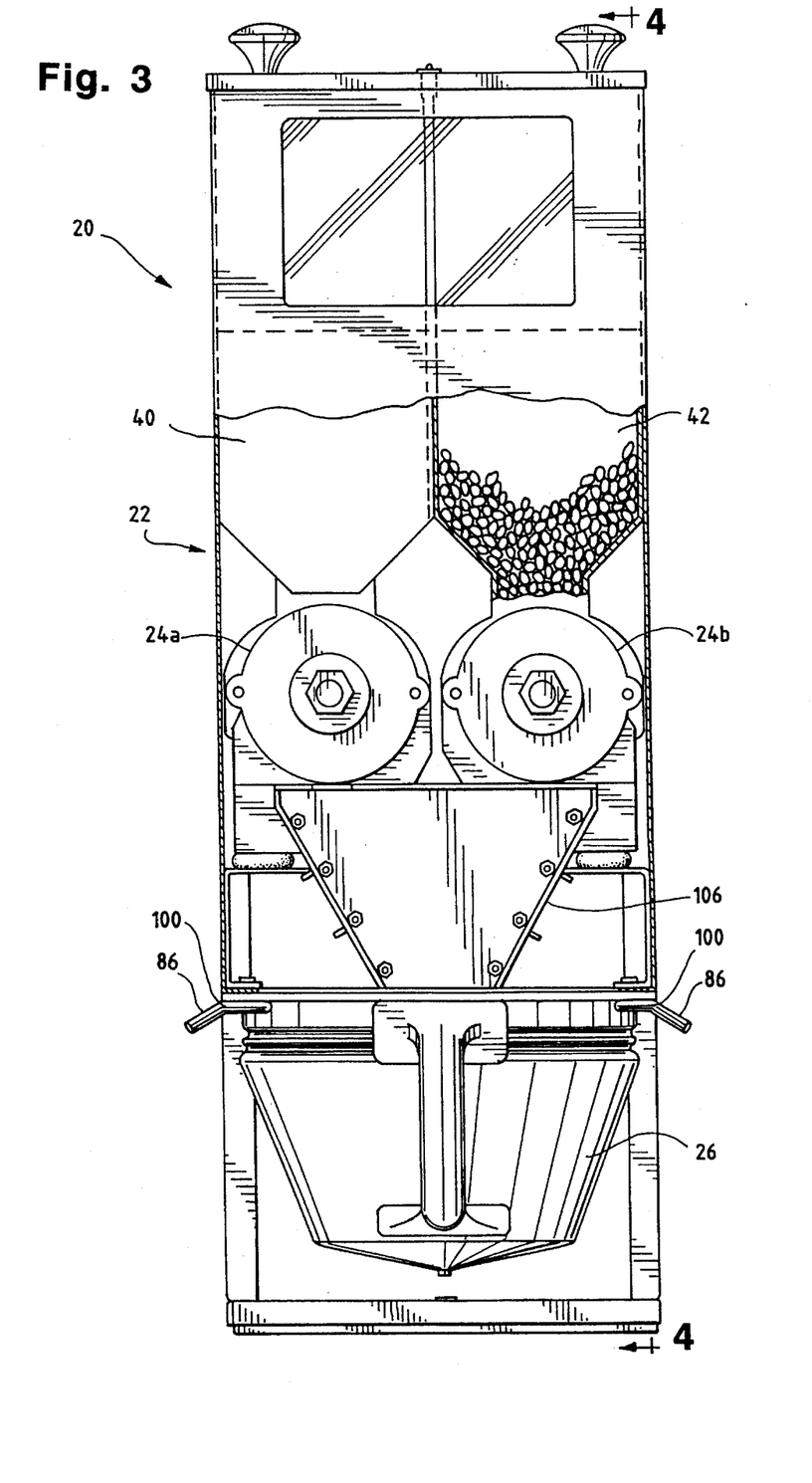
FIG. 3 is a front elevational view of a grinding apparatus of the present invention.
Figure 4:
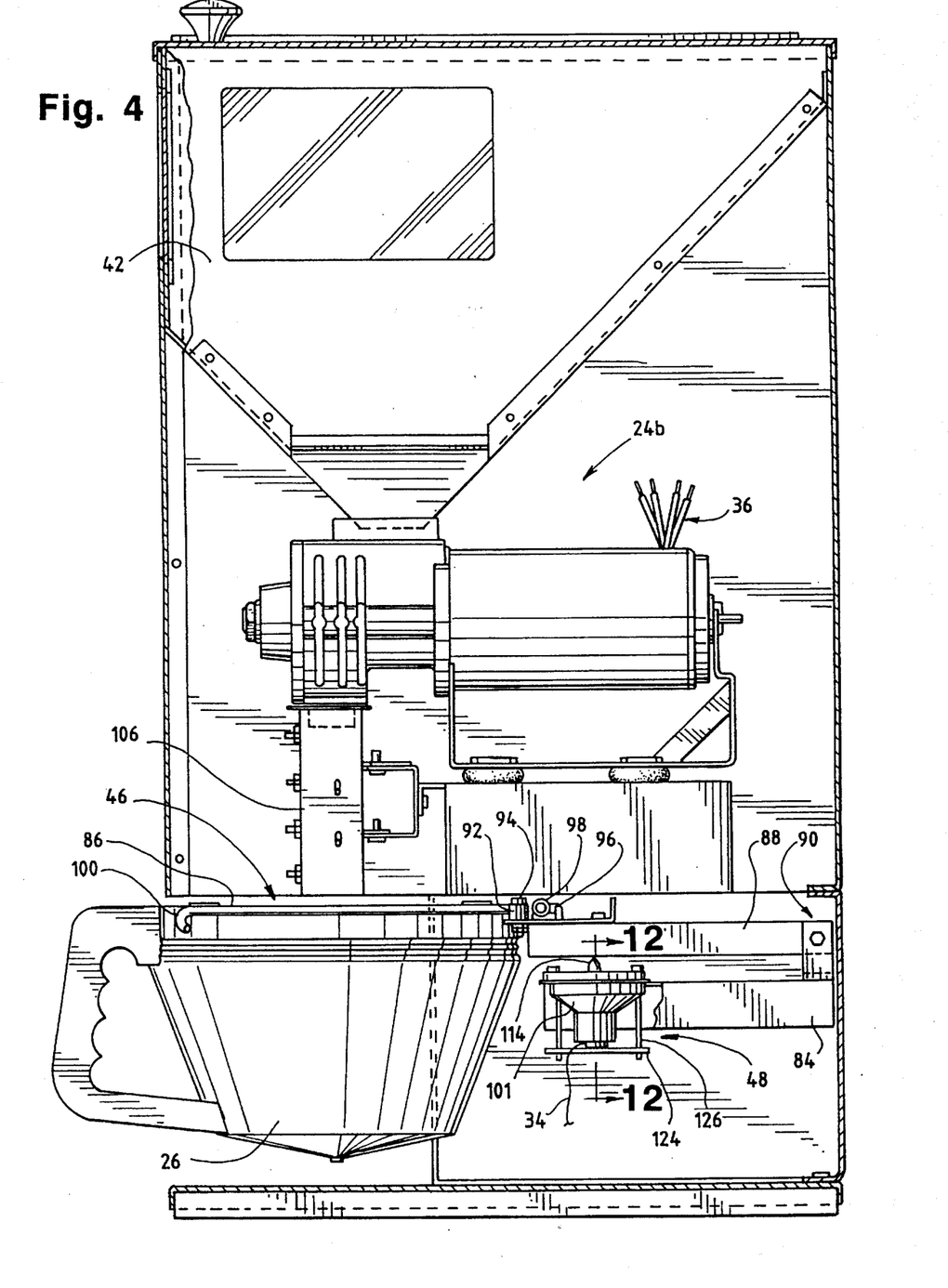
FIG. 4 is a side cross-sectional view taken along 4—4 in FIG. 3.

With reference to FIGS. 2–4, the coffee grinding apparatus 20 is essentially the same as that as shown in FIG. 1 with the addition of two independent grinding mechanisms 24a and 24b. Each grinding mechanism 24a, 24b is controlled over a separate control line 36a, 36b coupling the grinding mechanisms 24a, 24b to the control circuit 30. The use of two independent grinding mechanism 24a, 24b eliminates any possibility of mixing any portion of ground coffee dispensed therefrom. A problem which prevented use of two independent grinding mechanisms 24a, 24b in the prior art is that grinding mechanisms use an AC inductive motor of at least ⅓ horse power. If two such AC motors were used, the overall width of the grinding apparatus 20 would be undesirable. As such, the present invention uses two permanent magnet DC motors which have high torque capabilities to satisfy the grinding requirements associated with grinding whole coffee beans. The outside dimensions of the permanent magnet DC motors 52 are much smaller than the AC motor and are conveniently controllable by way of the control circuit 30.

With further specific reference to FIGS. 3 and 4, the coffee grinding apparatus 20 is configured with two hoppers 40,42 and two grinding mechanisms 24a, 24b. The dispensing means 22 is provided by the gravity feed relation of the hoppers 40,42 with the respective grinding mechanisms 24a, 24b. The configuration as shown in FIGS. 3 and 4 does not include a mechanical dispensing assembly 44. This configuration controllably grinds the precise weight of ground coffee selected at the selector 38 by controlling the grinding mechanisms 24a, 24b. In use, the user selects a weight and type of bean to be ground at the selector 38. The control circuit 30 operates the appropriate grinding mechanism associated with the user selection. The grinding mechanism is activated and is slowed or deactivated as the actual weight sensed by the weighing means 28 and the selected weight approach parity.

Figure 11:
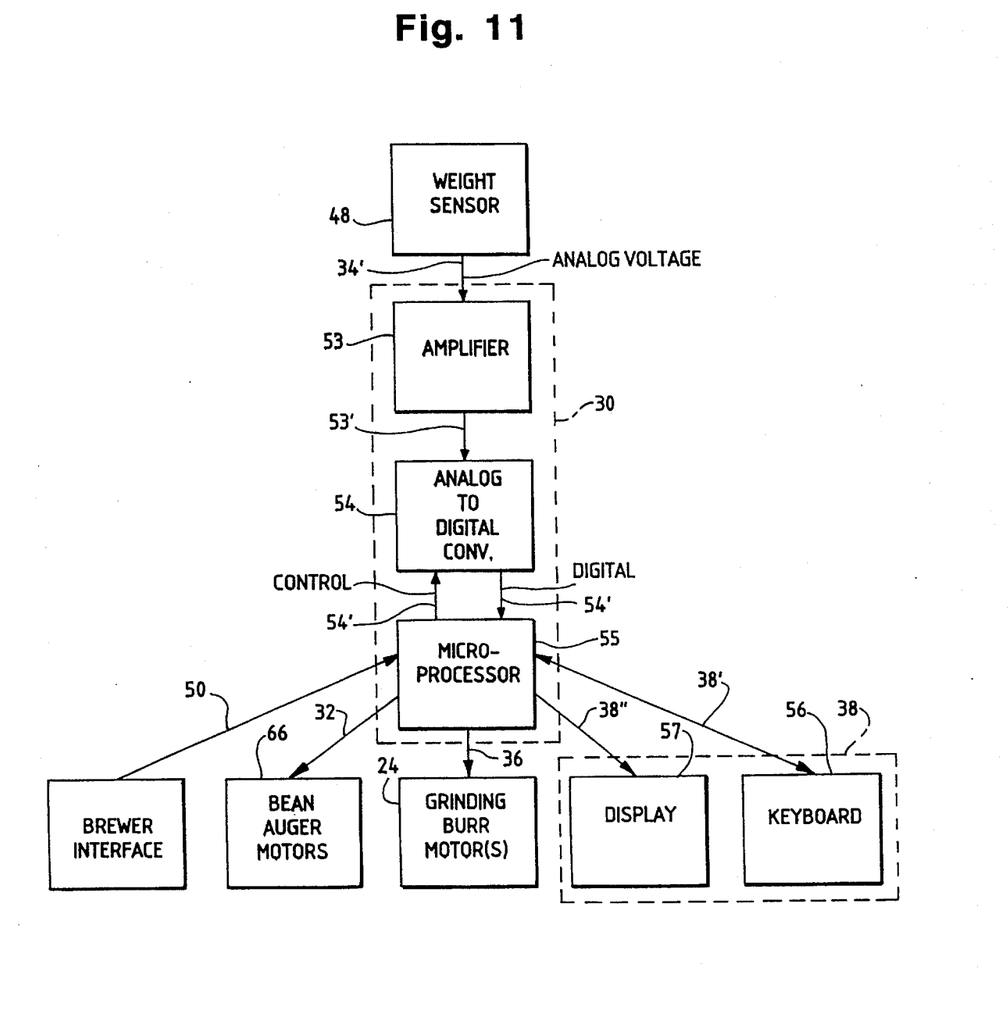
FIG. 11 is a general flow chart showing the control of the coffee grinding apparatus.

With reference to FIG. 11, the weight sensor 48 of the weighing means 28 provides an analog voltage output 34' which is passed to an amplifier 53 which scales and level shifts the signal. The amplified signal 53' generated by the amplifier 53 is fed to an analog to digital converter 54 (ADC) which then produces a digital output signal 54' representing the weight of ground coffee which has accumulated. This signal 54' is utilized by a microprocessor 55 of known construction having memory capabilities for storing preset selections. The selector 38 as shown in FIG. 11 includes a keyboard and display 56,57. The keyboard 56 is used to enter or select a desired weight of ground coffee to be produced by the grinding apparatus 20. The selector 38 both transmits information to (line 38') and receives information from (line 38") the microprocessor 55. The microprocessor 55 controls the grinding mechanism 24 and the drive motor 66 of the drive mechanism 64).

Having described the overall structure and embodiment of the coffee grinding apparatus 20 of the present invention, we shall now refer to FIGS. 5–11 to discuss further details of the dispensing assembly 44, support structure 46 weighing means 28, and weight sensor 48.

Figure 5:
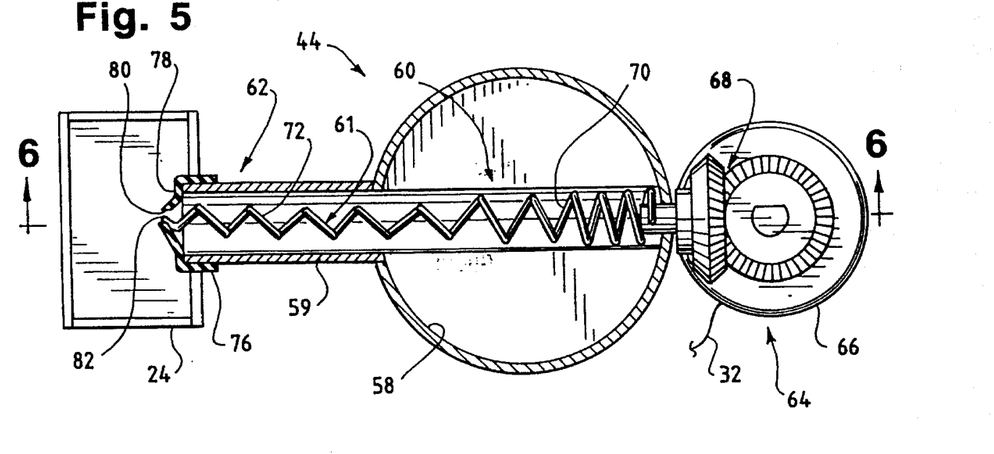
FIG. 5 is a detailed, partial fragmentary, cross-sectional plan view of an augering dispensing assembly for use with the grinding apparatus of the present invention.
Figure 6:
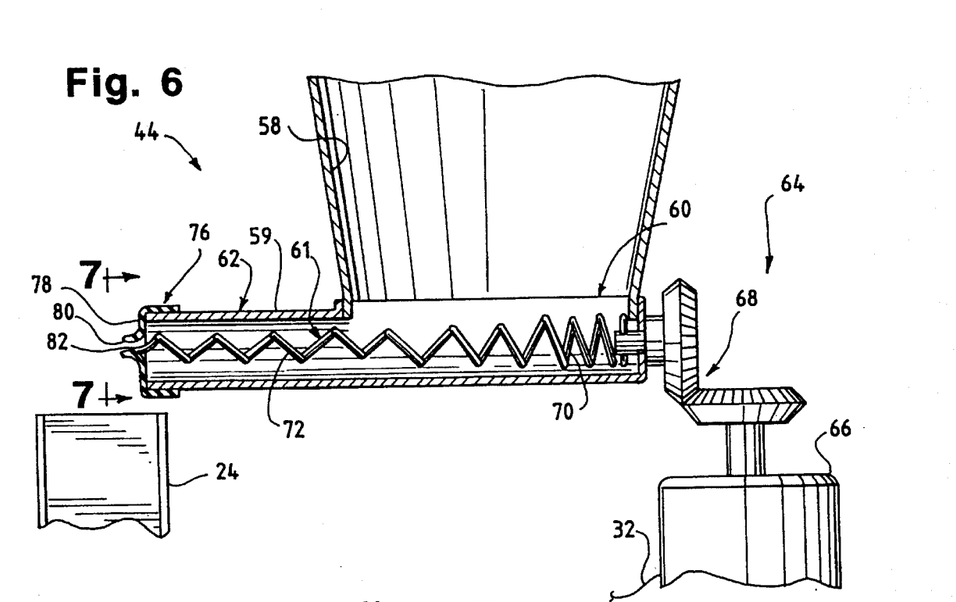
FIG. 6 is a partial fragmentary, cross-sectional side elevational view taken along line 6—6 in FIG. 5 of the dispensing assembly.

The dispensing assembly 44 includes sloped hopper walls 58 which communicate with a dispensing tube 59. The hoppers 40,42 and dispensing tube 59 are of a known construction, such as is shown in U.S. Pat. No. 5,277,337 to Ford et al. The sloped hopper walls 58 promote the flow of whole beans from the hopper into a receiving end 60 of the dispensing tube 59. An auger 61 is retained in the dispensing tube 59 extending from the receiving end 60 to a dispensing end 62. The auger 61 is connected to a drive mechanism 64 which rotates the auger 61 in the dispensing tube 59 to advance beans through the tube 59 towards the dispensing end 62.

The drive mechanism 64 includes a drive motor 66 and a gear assembly 68. The gear assembly 68 is positioned outside of the whole bean flow path so as to prevent grinding or damaging whole beans which are advanced by the auger 61. The auger 61 includes a primary drive section 70 and a secondary drive section 72. The primary drive section 70 has an outside diameter of approximately ¾" while the secondary drive section 72 has a diameter of approximately ½"–⅝". The pitch of the secondary drive section 72 is slightly greater than the primary section 70 so as to keep the feed ratio approximately the same along the two sections 70,72. Maintaining a generally equal feed ratio provides a generally constant flow of whole beans through the dispensing tube 59. The reduced diameter section of the secondary drive section 72 eliminates jamming or catching of beans on the inside of the dispensing tube 59 near the dispensing end 62. The reduced diameter provides greater clearance between the outside of the auger 61 and the inside of the dispensing tube 59.

Figure 7:
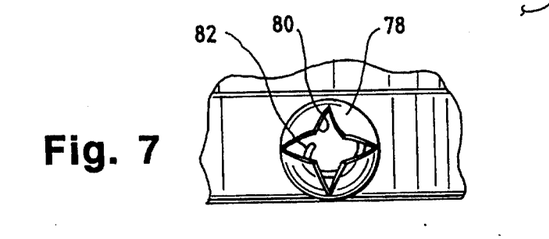
FIG. 7 is a front elevational view taken along line 7—7 in FIG. 5 showing a discharge regulator attached to a dispensing end of the dispensing assembly.

With reference to FIGS. 5–7, a discharge regulator 76 is placed over the discharge end 62 of the dispensing tube 59. The discharge regulator 76 is a resilient cap which is secured to the dispensing tube 59 having a front face 78 overlying the open end of the dispensing end 62 and having a plurality of slits 80 formed through the face 78. The slits 80 in combination with a tip 82 of the auger 61 extending through the slits 80 allow beans to be discharged from the dispensing tube 59 and into the grinding mechanism 24. The discharge regulator 76 prevents beans from dribbling or uncontrollably flowing out of the dispensing tube 56 under the influence of vibrations from the grinding mechanism 24. The protrusion of the tip 82 through the slits 80 increases the size of the opening while the auger 60 is being driven thereby creating a larger opening to drive the beans through and thereby preventing forced ejection of beans through the resilient surface 78 of the regulator 76.

In use, the drive mechanism 64 of the dispensing assembly 44 is connected or interfaced by way of line 32 to the control circuit 30. The control circuit 30 slows down the drive mechanism 64 as the actual weight of ground coffee sensed by the weighing means 28 approaches parity with the selected weight to be ground. By slowing down the auger 61, the weighing means 28 precisely senses the approaching selection weight. Additionally, by slowing down the auger speed, the grinding mechanism catches up and eliminates any backlogged beans and operates in a "starved grinder" mode. In other words, the grinding mechanism 24 grinds beans as soon as they are dispensed from the dispensing assembly 44. This prevents grinding beans after the selected weight is sensed by the weighing means 28.

Figure 8:
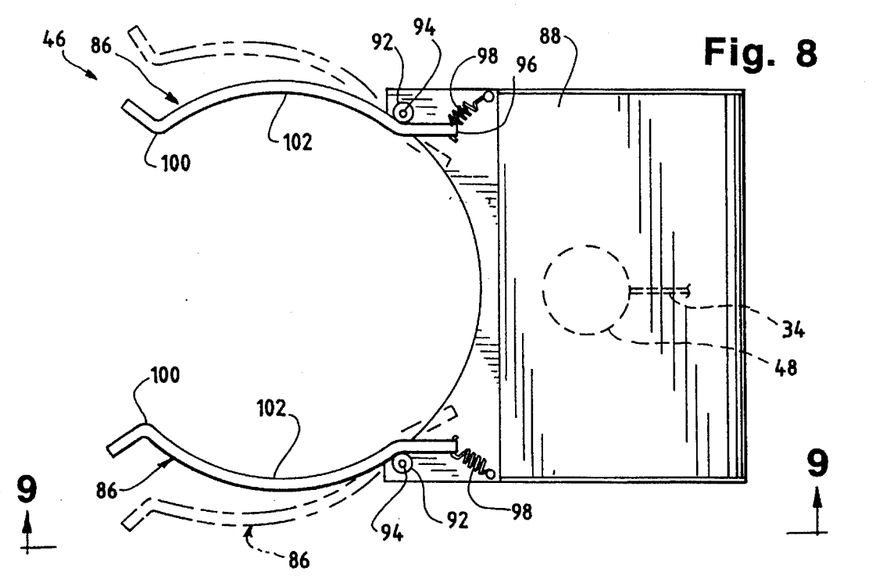
FIG. 8 is a partial fragmentary, cross-sectional plan view taken along line 8—8 in FIG. 3 of a weighing device employed in the coffee grinding apparatus.
Figure 9:
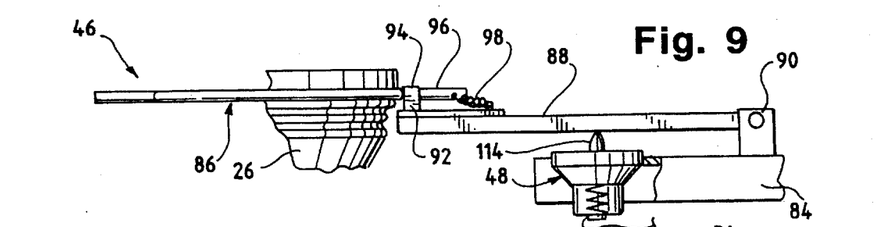
FIG. 9 is a partial fragmentary, side elevational view taken along line 9—9 in FIG. 8 of the weighing device.

FIGS. 8 and 9 provide a plan and side elevational view of the weighing means 28 which includes the support structure 46 and the weight sensor 48. FIG. 9 is a simplified illustration of the weighing means 28 so as to assist in clarifying the basic principle of the weighing means 28. As shown in FIGS. 3 and 4, the support structure 46 and weight sensor 48 are operatively associated with a fixed structure or mounting bracket 84 of the grinder apparatus housing. The support structure 46 includes a pair of pivotable arms or curved rails 86 operatively attached to a lever member 88 which is hingedly attached by way of a hinge assembly 90 to the bracket 84. An attachment member 92 of the curved rails 86 engage a pivot post 94 which depends from the lever member 88. A free end 96 of the attachment member 92 extends beyond the pivot post 94. A spring 98 is attached at one end to the free end 96 and at an opposite end to the lever member 88. The spring 98, in combination with the pivotable post 94, provides a biasing effect to help maintain a minimum opening between distal ends 100 of the rails 86.

Figure 12:
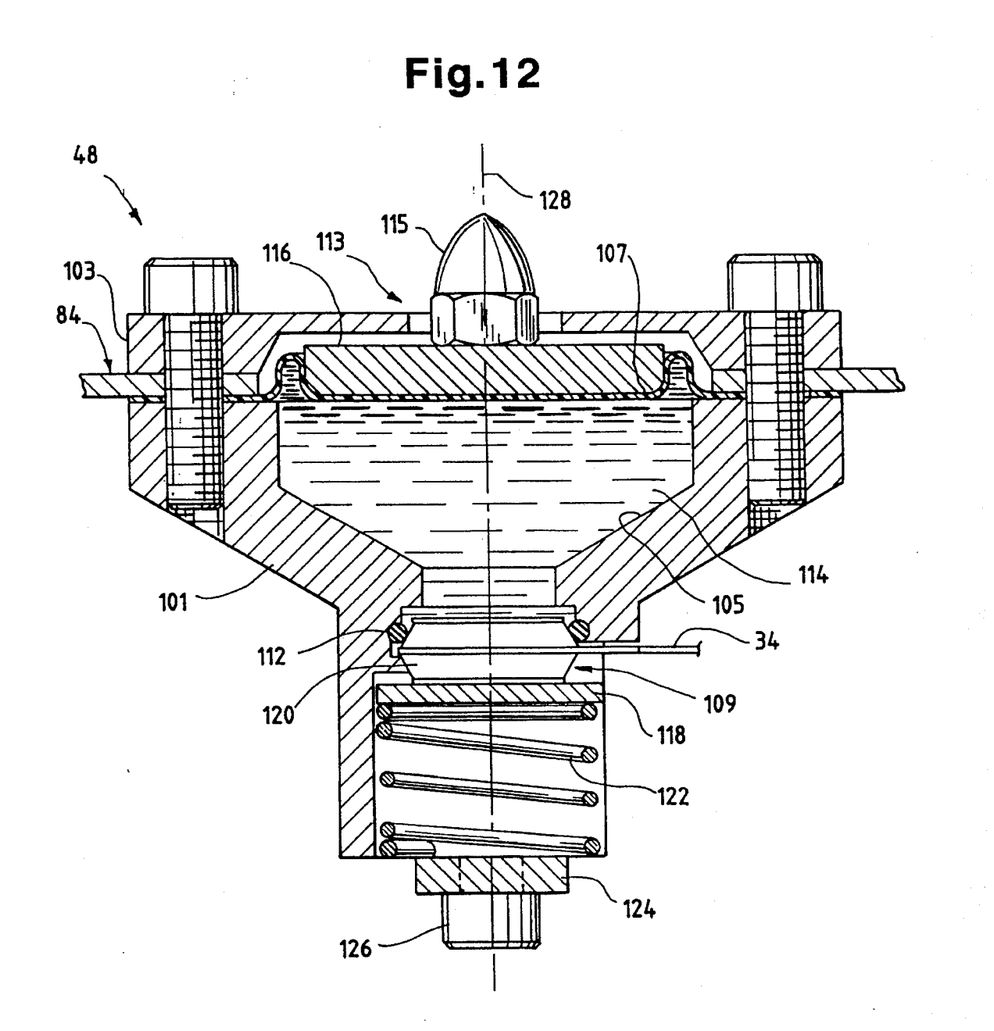
FIG. 12 is an enlarge, partial fragmentary, cross-sectional side view taken along line 12—12 in FIG. 4 of the weight sensor.

With reference to FIG. 12, the weight sensor 48 of the weighing means 28 is shown in an enlarged, partial fragmentary, cross-sectional view. The weight sensor 48 includes a housing 101 and a cover 103 which are attached to the bracket 84. A hollow area inside the housing 101 and cover 103 defines a cavity 105. An upper end of the cavity 105 is sealed by a resilient flexible diaphragm 107 and a lower portion of the cavity is sealed by a pressure sensing device 109 and a sealing gasket 112. A liquid 114 is retained in the cavity 105 between the diaphragm 107 and the pressure sensing device 109 and gasket 112. A contact body 113 including a crown 115 attached to a base 116 is retained between the cover 103 and the diaphragm 107. The base 116 abuts the diaphragm 107 and the crown 115 extends through the cover 103. Weight is applied to the tip of the crown 115 and transmitted as a pressure or force through the base 116 and diaphragm 107 to the incompressible liquid 114.

The pressure sensing device 109 is biasedly retained in the lower portion of the cavity 105 by a biasing plate 118, 118 positioned immediately below a body structure 120 of the pressure sensing device and a retaining spring 122 which is held against the biasing plate 118 by a retaining bracket 124 connected to the bracket 84 by way of retaining rod 126. The liquid in the cavity 114 is generally incompressible and is selected to be compatible With the surrounding materials such as the material used to form the housing 101 and the diaphragm 107. In order to ensure the incompressibility of the liquid 114, the cavity 105 filled with the liquid 114 can be evacuated of air in a vacuum chamber prior to sealing the weight sensor 48.

The sensing device 109 is held against the gasket 112 by a retaining spring 122. The retaining spring 122 is sized to preload the sensing device 109 above the working pressure of the monolithic sensor retained therein. The retaining spring 122 is part of a relief valve assembly which prevents damage to the pressure sensing device 109. The spring 122 is sized so that if an overload condition is put on the sensing device 109, the spring 122 will give and act as a pressure relief valve and allow the seal between the sensor body 120 and gasket 112 to disengage and leak fluid 114 thereby relieving any excess pressure. The relief valve feature of the weight sensor 48 prevents damage to the sensing device 109 by bleeding off liquid to reduce excessive pressure.

The pressure sensing device 109 is of known construction such as a monolithic silicone piezoresistor pressure sensor as produced by Motorola Corporation. The pressure sensing device 109 generates a changing output voltage with variations in applied pressure. The output voltage is directly proportional to the pressure applied to the sensing device 109.

The weight sensor 48 functions to sense a weight and convert the sensed weight to an analog electrical signal proportional to the given weight. As the weight is applied at the crown 115 in a direction generally perpendicular to a central axis 128 of the sensor 48, the diaphragm 107 builds pressure in the liquid 114 retained in the housing 101 equal to the actual weight divided by the area of the exposed diaphragm 107. The pressure is sensed by the pressure sensing device 109, which produces an analog voltage output proportional to the pressure sensed within the weight sensor 48. The actual total maximum volumetric change is quite small, for example 0.001 cubic inches. The total full scale weight actual movement of the diaphragm 107 is equal to the volume change divided by the area of the diaphragm 107, if an incompressible liquid 114 is used.

The use of the incompressible liquid evacuated of air and all other gases ensures minimum diaphragm movement. This characteristic is desirable so that as ground coffee is discharged into the receptacle, the lever member 88, resting on top of the crown 115, moves through an almost imperceptible range of movement. The extremely small range of movement of the lever member 88 minimizes or essentially eliminates any friction in the pivot point of the hinge assembly 90. As such, a precision bearing assembly is not required.

In use, a funnel 26 is placed through the opening between the distal ends 100 of the rails 86 overcoming the biasing effect of the spring 98 and is retained between the curved areas 102 of each rail 86. Since the lever member 88 is hinged at one end by the hinge assembly 90 and because the weight sensor 48 is positioned underneath the lever member 88, the weight of the funnel 26 retained on the curved rails 86 exerts a force on the weight sensor 48 thereby generating a weight signal over line 34 to the control circuit 30. The control circuit 30 uses the empty weight of the funnel as a tare weight thereby establishing a zero reference point which is used to weigh the ground coffee which is collected in the funnel 26. As ground coffee is deposited into the funnel 26, a proportionate amount of weight is applied to the weight sensor 48. An analog electrical signal corresponding to the sensed weight is generated by the sensor 48.

Figure 10:
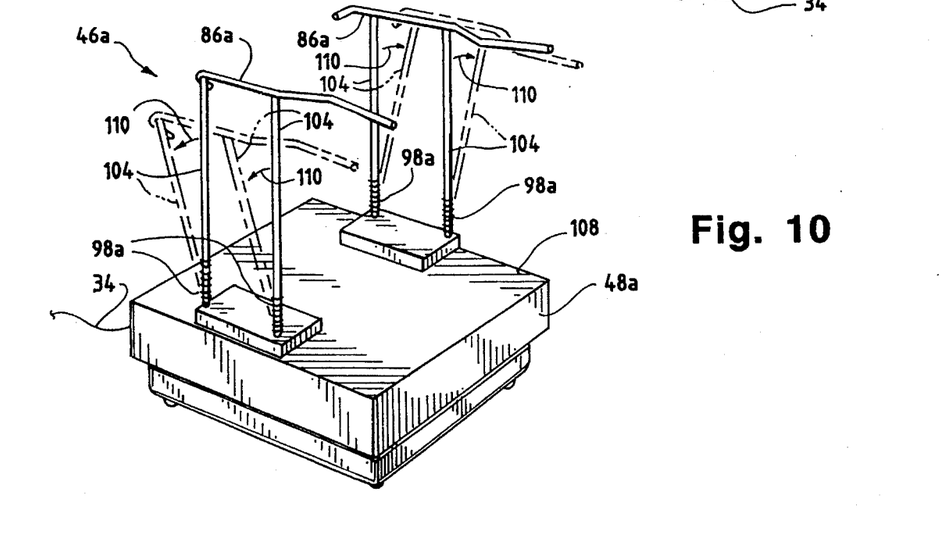
FIG. 10 is a perspective view of alternate configuration of the weighing device.

With reference to FIG. 10, an alternate embodiment of the funnel support structure 46a is shown. It should be noted that structures which function in generally the same manner will be identified using the same reference numerals with the addition of an alphabetic suffix. For example, the curved rails in FIG. 8 are identified with reference numeral 86 whereas in FIG. 10, they are identified with reference numeral 86a. The curved rails 86a are spaced apart and lie in a generally horizontal plane attached to vertically oriented legs 104. The legs 104 are dimensioned to locate the uppermost edge of the curved rails 86a to position a funnel retained thereon proximate to a discharge chute 106 of the grinding apparatus 20. The legs 104 are attached to a weight sensor 48a which senses the weight of objects placed on a weighing surface 108. The weight of a funnel 26 retained on the rails 86a is transferred to the weight sensor 48a to sense a tare weight prior to discharging ground coffee into the funnel 26. As ground coffee accumulates in the funnel, the weight sensor 48 senses the increasing weight and provides a signal over line 34 to the control circuit 30. The support structure 46a is constructed so that the rails 86a can move outwardly away from each other (see arrows 110) to accommodate funnels and receptacles of greater diameter. Springs 98a are provided along the legs 104 to provide a biased pivoting point to provide biasing displacement.

In use, the present invention dispenses whole coffee beans from storage hoppers 40,42 into one or more grinding mechanisms 24 for grinding and dispensing into a receptacle or funnel 26. The weight of the ground coffee is weighed or sensed by the weighing means 28. The control circuit 30 provides precise control of the dispensing means 22 and/or the grinding mechanism 24 so that only a precise selected weight of ground coffee is produced and dispensed into the receptacle 26.

A user operates the grinding apparatus 20 by selecting, at the selecting means 38, a weight of ground coffee to be produced. The weight of the receptacle 26 retained on the support structure 46 is tared so as to provide a zero reference point to weigh the ground coffee. Once grinding is initiated, the weighing means 28 senses the weight of the ground coffee dispensed into the receptacle and, since it is interfaced with the control circuit 30 over line 34, provides a signal corresponding to the weight of the accumulated ground coffee. The control circuit 30 compares the actual weight signal to the selected weight signal and operates the dispensing means 22 and/or grinding mechanism 24 in response to the comparison. As the two signals, the actual weight signal and the selected weight signal, approach parity, the dispensing means 22 is controlled to slow the feed rate of whole beans to the grinding mechanism 24 or the grinding mechanism 24 is deactivated.

When using the embodiment employing the dispensing assembly 44, the control means 30 operates the dispensing assembly 44, such as is shown in FIGS. 5 and 6, to dispense whole beans into the corresponding grinding mechanism. As the actual weight signal and selected weight signal approach parity, the control signal 30 slows the dispensing rate of the dispensing assembly 44 such that the actual weight of the ground coffee controllably approaches the selected weight and thereby provide a precise measurement of ground coffee.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A weight sensor in combination with a coffee grinding apparatus comprising:

a grinding mechanism for grinding coffee beans placed therein;

means for dispensing beans to the grinding mechanism;

means for selecting a weight of ground coffee for grinding by said grinding mechanism, said selecting means producing a first signal corresponding to the selected weight of coffee to be ground;

a receptacle operatively associated with said grinding apparatus for receiving ground coffee from the grinding mechanism;

said weight sensor being operatively associated with said receptacle for sensing the weight of ground coffee collected in said receptacle and producing a second signal corresponding to the weight of the ground coffee, said weight sensor having a hollow housing and a cover, said hollow housing and cover defining a cavity, said cavity retaining an incompressible liquid, a flexible diaphragm retained between said cover and housing in said cavity and being operatively associated with said incompressible liquid, a contact body positioned between said cover and said diaphragm, a first portion of said contact body abutting said diaphragm and a second portion of said contact body extending through said cover, forces applied to said second portion of said contact body being transferred to said incompressible liquid, and an electronic pressure sensing device operatively associated with said incompressible liquid, forces corresponding to weight to be sensed transferred through said incompressible liquid being sensed by said pressure sensing device, said pressure sensing device generating an analog signal proportional to the force applied to said contact body;

a control circuit coupled to said dispensing means, said selecting means and said weight sensor, said control circuit controlling said dispensing means as a function of a comparison of said second signal received from the weight sensor and said first signal, said control circuit controlling said dispensing means for decreasing the rate at which coffee beans are dispensed into said grinding mechanism as said first and second signals approach parity.

2. A weight sensor in combination with a coffee grinding apparatus as recited in claim 1, further comprising a relief valve assembly operatively associated with said housing for releasing incompressible liquid from said cavity to relieve excessive pressure in said incompressible liquid and prevent damage to said pressure sensing device.

3. A weight sensor in combination with a coffee grinding apparatus as recited in claim 2, said relief valve assembly further comprising a biasing device operatively associated with said pressure sensing device and said housing for biasedly retaining said pressure sensing device in association with said housing and in contact with said incompressible liquid, said biasing device providing a biasing force which is less than a maximum allowable pressure on said sensing device.

4. A weight sensor in combination with a coffee grinding apparatus as recited in claim 1, further comprising said control circuit being coupled to said grinding mechanism for stopping said grinding mechanism a predetermined time after parity of said first and second signals.

5. A weight sensor in combination with a coffee grinding apparatus as recited in claim 1, further comprising a receptacle support structure operatively associated with said second portion of said contact body of said weight sensor and said grinding mechanism for supporting said receptacle proximate to said grinding mechanism to collect ground coffee discharged from said grinding mechanism and sense the weight of the ground coffee with said weight sensor.

6. A weight sensor in combination with a coffee grinding apparatus as recited in claim 1, wherein said selection means is coupled to a beverage brewing apparatus such that selection of a quantity of beverage to be brewed at said beverage brewing apparatus produces said second signal corresponding to the weight of ground coffee to be produced by said grinding mechanism.

7. A weight sensor for use with a coffee grinding apparatus, said weight sensor comprising:

a hollow housing and a cover, said hollow housing and cover defining a cavity, said cavity retaining an incompressible liquid;

a flexible diaphragm retained between said cover and housing in said cavity and being operatively associated with said incompressible liquid;

a contact body positioned between said cover and said diaphragm, a first portion of said contact body abutting said diaphragm and a second portion of said contact body extending through said cover, forces corresponding to weight to be sensed applied to said second portion of said contact body being transferred to and through said incompressible liquid;

an electronic pressure sensing device operatively associated with said incompressible liquid, said forces transferred through said incompressible liquid being sensed by said pressure sensing device, said pressure sensing device generating an analog signal proportional to the force applied to said contact body.

8. A weight sensor as recited in claim 7, further comprising a relief valve assembly operatively associated with said housing for releasing incompressible liquid from said cavity to relieve excessive pressure in said incompressible liquid and prevent damage to said pressure sensing device.

9. A weight sensor as recited in claim 8, said relief valve assembly further comprising a releasable biasing device operatively associated with said pressure sensing device and said housing for biasedly retaining said pressure sensing device in association with said housing and in contact with said incompressible liquid, said biasing device providing a biasing force which is less than a maximum allowable pressure on said sensing device.

* * * * *

UNITED STATES PATENT AND TRADEMARK OFFICE
CERTIFICATE OF CORRECTION

PATENT NO. : 5,522,556
DATED : June 4, 1996
INVENTOR(S) : John T. Knepler, William E. Midden and David F. Ford It is certified that error appears in the above-indentified patent and that said Letters Patent is hereby corrected as shown below:

Column 7, Line 64 "With" should be -- with --

Column 10, Line 25 "forces applied to said second portion" should be -- forces corresponding to weight to be sensed --

Column 10, Line 26 "transferred to said" should be -- transferred to and through said --

Column 10, Line 28 "liquid" should be -- liquid, said forces --

Column 10, Line 51 "comprising a" should be -- comprising a releasable --

Signed and Sealed this

Seventh Day of January, 1997

Attest:

BRUCE LEHMAN

*Attesting Officer*     *Commissioner of Patents and Trademarks*